Patented June 12, 1951

2,556,451

UNITED STATES PATENT OFFICE 2,556,451

FUNGICIDAL INSULATING COMPOSITION

Howard E. Smith, Briarcliff Manor, N. Y., assignor to Insl-X Corporation, Brooklyn, N. Y., a corporation of New Jersey No Drawing. Application February 13, 1947, Serial No. 728,375

5 Claims. (Cl. 260—23)

This invention relates to a hot melt coating material that is moisture and fungus resistant and more particularly to a coating material capable of successfully withstanding both the extremely low and extremely high temperatures that might be encountered in transportation and use of electrical equipment, and which is highly effective in preventing fungicidal development or attack on its surfaces.

This application is a continuation-in-part of application No. 548,315, filed Aug. 5, 1944 now abandoned.

Electrical equipment such as coils, resistors, and a variety of electrical parts such as radio parts must be insulated and protected generally against the deleterious influences.

Various insulating compounds have been proposed but under many conditions of transportation and use, particularly extremes in temperatures, humidity and fungicidal attack such insulating compositions fail to fill their desired functions. Such failures are extremely important because any single failure in any part of the equipment may result in the non-functioning of the equipment as a whole.

When the equipment is shipped, particularly for long distances, it is subject to extremes in temperature and the temperature range over which it must operate may vary greatly in short periods of time.

Further, when the equipment is used in tropic and semi-tropic conditions, the fungicidal or biological organism attack is a dangerous factor since it may result in insulation failure.

Although many fungicidal ingredients have been proposed, many of these present dangers to personnel in handling or in application.

It is the object of the present invention to provide a novel coating material that is highly resistant to moisture penetration or to fungus attack.

It is a further object of the present invention to provide a hot melt coating material that is stable and renders satisfactory surface protection under extremes of temperature ranging from approximately −40° F. to +240° F.

It is a further object of the present invention to provide a coating material that is substantially permanently resistant to fungus attack.

It is a further object of the present invention to provide a coating material containing fungicidal agents that are non-toxic to personnel both in handling and in the application of the coating material to the parts to be coated.

It is a further object of the present invention to provide a coating material that is stable and can maintain its necessary properties for a considerable period of time while maintained at an elevated operating or hot melt temperature.

It is the further object of the present invention to provide a hot melt fungus resistant insulating compound that will not crack at a temperature of about −40° F.

It is a further object of the present invention to provide a hot melt insulating material that will not cold flow at a temperature of +240° F.

It is a further object of the present invention to provide an insulating material having a high dielectric strength.

It is a further object of the present invention to provide an insulating material having a low water vapor diffusion constant.

It is a further object of the present invention to provide an insulating material having the desirable properties listed herein which will adhere to surfaces to be coated at a temperature of −40° F.

It is a further object of the present invention to provide an insulating material having moisture resistant and fungus resistant properties as set forth herein which will not corrode bare metals such as copper electrodes when coated thereover.

The objects of this invention are accomplished by providing a composition comprising lanolin, a butyl methacrylate polymer, a high melting point waxy acylamide, a low freezing point plasticizer, a resin and phenyl mercury ortho benzoic sulfimide.

Specifically the composition of this novel moisture resistant and fungus resistant hot melt coating compound may be as follows:

A

| | Parts |
|---|---|
| Lanolin | 16.8 |
| n-butyl methacrylate polymer | 33.6 |
| Stearamide | 16.8 |
| Dibutoxy ethyl phthalate | 4.2 |
| Chlorinated diphenyl | 28.6 |
| Phenyl mercuric ortho benzoyl sulfimide | 1.0 |

B

| | Parts |
|---|---|
| Lanolin | 14 |
| n-butyl methacrylate polymer | 28 |
| Myristic acid amide | 14 |
| Dibutoxy ethyl phthalate | 3.5 |
| Hydrogenated methyl abietate | 5.5 |
| Coumarone-indene resin | 35.5 |
| Phenyl mercuric ortho benzoyl sulfimide | 1.0 |

The operative range which will affect only high and low temperature behavior and not appreciably change fungicidal, water or electrical resistance, are Lanolin _____parts__ 10 to 30
n-butyl methacrylate polymer ___do____ 20 to 40
Higher fatty acid amide _____do____ 10 to 20
Resin:
    Chlorinated diphenyl, coumarone-indene, or hydrogenated methyl abietate or mixtures thereof _____parts__ 5 to 50
Plasticizer _____do____ 2 to 20
Phenyl mercuric ortho benzoyl sulfimide _____percent__ .5 to 2.0

In the specific examples given hereinabove, there may be employed in lieu of n-butyl methacrylate polymer, isobutyl methacrylate or combinations of n-butyl and isobutyl methacrylate, or combinations or copolymers of isobutyl and butyl methacrylate and other methacrylates. In lieu of the dibutoxy ethyl phthalate which is a plasticizer, other low freezing point plasticizers, such as for example tri-butyl phosphate, may be employed. The plasticizer must not freeze above a temperature of $-40°$ F.

As will be noted from the above examples, various resins may be employed, those here exampled being chlorinated diphenyl, hydrogenated methyl abietate and coumarone-indene resin. The coumarone-indene resin employed is a light colored solid having a melting point of around 105° C. The chlorinated diphenyl employed is a light amber crystalline material containing about 54% of chlorine and having a melting point of around 80° C. The melting point of the resin should not exceed 150° C. Depending upon the electrical characteristics desired, that is, power factor, dielectrical strength, etc., other resins may be employed in lieu of this particular ingredient.

The waxy acyl amides employed are the amides of higher fatty acids which generally have melting points of about 80° C. or more. Stearamide, myristic acid amide and palmitic acid amide are examples of such acyl amides. Various mixtures of the acyl amides may also be employed.

Generally, the combination of parts set forth is critical for the characteristics and qualities desired which are enumerated above.

The phenyl mercury ortho benzoyl sulfimide is advantageous over other fungicidal compounds and specifically over other phenyl mercury compounds, not only because of its low toxicity to personnel and highly effective fungicidal action but also because of its compatibility with other ingredients listed in the examples and because of its freedom from corrosive effect on the metal, and non-impairment of the electrical properties of the insulating material.

The examples of my coating material recited are highly effective fungical hot melt coating compounds which when coated over electrical parts provide an effective permanent fungicidal insulating material free from adverse effect on the mechanical or electrical properties of the part covered.

For application, the coating material of this invention is heated to a temperature of between 302° F. and 320° F., which renders it liquid and well adapted for the coating operation and the part to be dipped is flash dipped in the coating material for a period of not more than about three seconds.

After the part to be dipped is so treated it is withdrawn and the hot melt coating material is allowed to freeze to solid form.

In addition to providing insulating coverings or coatings for electrical parts, the compounds of this invention may also be employed to repair defective insulating coatings previously applied or to enhance the insulating values of unimpaired previous insulating coatings.

The coating material of this invention has a practical advantage in that it is stable and maintains its intermediate and ultimate properties for many hours while maintained at an operating temperature as set forth above in the mixing and dipping tanks.

This coating material is non-toxic to human beings at room temperatures so that no dermatitis or skin irritation is caused to personnel during the coating operation or to personnel handling the treated or finished parts.

The flash point of this coating composition is more than 392° F. and the material will not crack at a temperature of as low as $-40°$ F., nor will it cold flow at a temperature as high as 239° F.

The dielectric strength of the insulating compound of the present invention in dry form at room temperature is not less than 350 volts r. m. s. A. C. per mil at 60 cycles, and after immersion in distilled water for 24 hours at room temperature the dielectric strength is not less than 240 volts r. m. s. A. C. per mil at 60 cycles.

The water vapor diffusion constant of the material does not exceed $7 \times 10^{-8}$ grams per hour per centimeter per millimeter of mercury. The material adheres firmly to surfaces such as metals at temperatures of as low as $-40°$ F.

With regard to the important property of its fungicidal function, the insulating compound containing the phenyl mercury ortho benzoyl sulfimide is graded excellent according to the following scale:

| Grade | Area of Inhibition |
|---|---|
| Excellent | Over ½". |
| Good | ½" or less, but fungi do not touch edge of specimen. |
| Fair | Fungi touch edge of specimen. |
| Poor | Spots of fungi on the surface of specimen. |
| Bad | Fungi cover the surface of the specimen. |

The area of inhibition is determined when a filter paper three centimeters square is dip coated in the material and subjected in a Petri dish containing an agar test medium to *Aspergillus niger*.

Because of the peculiar combination of properties which the composition of this invention possesses and which are listed herein and because of the lasting effectiveness and compatibility of the respective components of the composition with one another, the particular ingredients and alternatives recited hereinabove provide a new and unexpected compound of new, unusual and important properties.

It is to be understood, of course, by those skilled in the art that minor variations of the percentage in the respective components may be effected and that the respective proportions may vary in certain respects depending on the electrical characteristics, hardness or temperature properties desired. The proportions listed, however, have been found to be outstandingly effective for the qualities herein listed.

I claim:

1. A hot melt coating comprising about 16.8 parts of lanolin, about 33.6 parts of butyl methacrylate polymer, about 16.8 parts of stearamide, about 4.2 parts of dibutoxy ethyl phthalate, about 28.6 parts of chlorinated diphenyl having a melting point of around 80° C., and about 1 part of phenyl mercury ortho benzoyl sulfimide.

2. A hot melt coating composition comprising about 10 to 30 parts of lanolin, about 20 to 40 parts of butyl methacrylate polymer, about 10 to 20 parts of a waxy higher fatty acid amide, about 5 to 50 parts of a resin having a melting point of less than 150° C., 2 to 20 parts of a plasticizer and about .5 to 2% of phenyl mercuric ortho benzoyl sulfimide, said composition having a dielectric strength in dry form at room temperature of not less than 350 volts r. m. s. A. C. per mil at 60 cycles and after immersion in distilled water for 24 hours at room temperature, a dielectric strength of not less than 240 volts r. m. s. A. C. per mil at 60 cycles, a flash point of more than 392° F., said composition being resistant to cracking at temperatures as low as −40° F. and resistant to flow at temperatures as high as 239° F.

3. A hot melt coating composition comprising 10 to 30 parts of lanolin, 20 to 40 parts of butyl methacrylate polymer, 10 to 20 parts of stearamide, 2 to 20 parts of plasticizer, 5 to 50 parts of chlorinated diphenyl having a melting point of around 80° C., and .5 to 2% of phenyl mercury ortho benzoyl sulfimide.

4. A hot melt coating composition comprising 10 to 30 parts of lanolin, 20 to 40 parts of butyl methacrylate polymer, 10 to 20 parts of myristic acid amide, 2 to 20 parts of plasticizer, 5 to 50 parts of chlorinated diphenyl having a melting point of around 80° C., and .5 to 2% of phenyl mercury ortho benzoyl sulfimide.

5. A hot melt coating composition comprising 10 to 30 parts of lanolin, 20 to 40 parts of butyl methacrylate polymer, 10 to 20 parts of palmitic acid amide, 2 to 20 parts of plasticizer, 5 to 50 parts of chlorinated diphenyl having a melting point of around 80° C., and .5 to 2% of phenyl mercury ortho benzoyl sulfimide.

HOWARD E. SMITH.

REFERENCES CITED

The following references are of record in the file of this patent:

UNITED STATES PATENTS

| Number | Name | Date |
|---|---|---|
| 2,097,339 | Patterson | Oct. 26, 1937 |
| 2,098,538 | Charch | Nov. 9, 1937 |
| 2,135,553 | Andersen | Nov. 8, 1938 |
| 2,211,689 | Dittmar | Aug. 13, 1940 |
| 2,232,595 | Dittmar | Feb. 18, 1941 |
| 2,412,590 | Lougovoy | Dec. 17, 1946 |
| 2,456,717 | Lowden | Dec. 21, 1948 |
| 2,486,487 | Lowden | Nov. 1, 1949 |

OTHER REFERENCES

Strain et al.: pp. 382–384 Ind. and Eng. Chem., April 1939.

"Cumar": pp. 12, 13, and 39, pub. 1936 by Barrett Co., N. Y.